(12) United States Patent
Kim

(10) Patent No.: US 12,340,500 B1
(45) Date of Patent: Jun. 24, 2025

(54) SYSTEMS AND METHODS FOR AUTOMATED CHARACTERIZATION OF FILLERS IN POLYMER MEDIUMS USING ENERGY DISPERSIVE X-RAY SPECTROSCOPY

(71) Applicant: Honeywell Federal Manufacturing & Technologies, LLC, Kansas City, MO (US)

(72) Inventor: Joseph Sang Kim, Mission, KS (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 0 days.

(21) Appl. No.: 19/038,127

(22) Filed: Jan. 27, 2025

(51) Int. Cl.
| | | |
|---|---|---|
| *G06K 9/00* | (2022.01) | |
| *G01N 3/08* | (2006.01) | |
| *G01N 23/2206* | (2018.01) | |
| *G01N 23/2251* | (2018.01) | |
| *G06T 7/00* | (2017.01) | |

(Continued)

(52) U.S. Cl.
CPC ............ *G06T 7/0004* (2013.01); *G01N 3/08* (2013.01); *G01N 23/2206* (2013.01); *G01N 23/2251* (2013.01); *G06T 7/11* (2017.01); *G06T 7/136* (2017.01); *G06T 7/70* (2017.01); *G01N 2223/401* (2013.01); *G06T 2200/24* (2013.01); *G06T 2207/10061* (2013.01);
(Continued)

(58) Field of Classification Search
CPC .......... B33Y 50/02; G06T 7/149; G06T 7/246
See application file for complete search history.

(56) References Cited

U.S. PATENT DOCUMENTS

| | | |
|---|---|---|
| 5,974,167 A | 10/1999 | Reszler |
| 10,043,274 B2 | 8/2018 | Varslot et al. |

(Continued)

FOREIGN PATENT DOCUMENTS

JP 6609388 B1 11/2019

OTHER PUBLICATIONS

Han, Gang, et al., Comparing Two Exponential Distributions Using the Exact Likelihood Ratio Test, NIH Public Access Author Manuscript, Stat Biopharm Res. Oct. 1, 2012; 4(4): 348-356. doi: 10.1080/19466315.2012.698945.

(Continued)

*Primary Examiner* — Hadi Akhavannik
(74) *Attorney, Agent, or Firm* — Erise IP, P.A.

(57) ABSTRACT

Systems, methods, and computer-readable media for automated characterization of fillers and pores in media using energy-dispersive X-ray spectroscopy (EDS) are disclosed. An EDS system comprising a scanning electron microscope and an EDS detector may be used to obtain an EDS image of media, such as a polymer component. The EDS image may be binarized and segmented to separate the fillers from the pores in the polymer component. Contours may be drawn around the filler segments, and these contours may be analyzed to determine geometrical properties of the fillers, such as the centroids and the area. The results may be plotted in histograms and displayed to a user. The results may also be used to determine whether the polymer component is within material specification and, if not, process parameters may be adjusted. Machine learning models for classifying the EDS images are also disclosed.

20 Claims, 10 Drawing Sheets

(51) Int. Cl.
*G06T 7/11* (2017.01)
*G06T 7/136* (2017.01)
*G06T 7/70* (2017.01)

(52) U.S. Cl.
CPC ............... *G06T 2207/20072* (2013.01); *G06T 2207/20081* (2013.01); *G06T 2207/30108* (2013.01)

(56) References Cited

U.S. PATENT DOCUMENTS

| | | | |
|---|---|---|---|
| 10,891,462 B2 | 1/2021 | Zhao | |
| 2009/0152759 A1* | 6/2009 | Malone | B29C 55/30 |
| | | | 425/467 |
| 2016/0035108 A1* | 2/2016 | Yu | A61B 5/721 |
| | | | 382/131 |
| 2016/0221262 A1* | 8/2016 | Das | B22C 9/24 |
| 2017/0136708 A1* | 5/2017 | Das | B22C 9/24 |
| 2017/0173868 A1* | 6/2017 | Mark | B29C 64/118 |
| 2017/0372480 A1* | 12/2017 | Anand | G06F 30/20 |
| 2018/0068441 A1* | 3/2018 | Yu | G06V 40/20 |
| 2018/0154574 A1* | 6/2018 | Mark | B22F 1/10 |

OTHER PUBLICATIONS

Oxford Instruments Nanoanalysis, Part of the Oxford Instruments Grou, 2025, https://nano.oxinst.com/.

\* cited by examiner

SYSTEMS AND METHODS FOR AUTOMATED CHARACTERIZATION OF FILLERS IN POLYMER MEDIUMS USING ENERGY DISPERSIVE X-RAY SPECTROSCOPY

STATEMENT OF GOVERNMENT SUPPORT

This invention was made with government support under Contract No.: DE-NA-0002839 awarded by the United States Department of Energy/National Nuclear Security Administration. The government has certain rights in the invention.

BACKGROUND

1. Field

Embodiments of the current disclosure generally relate to analyzing polymer mediums. More specifically, embodiments of the current disclosure relate to systems, methods, and computer-readable media for automatically analyzing polymer components to quantify various geometric parameters associated therewith based on energy dispersive X-ray spectroscopy (EDS, also abbreviated as EDX) data of polymer mediums.

2. Related Art

Fillers are often added to various mediums, such as composites including polymer matrix composites and other polymer components, to adjust the properties of the mediums. The impact of the fillers on the mediums may be based at least in part on (1) the size of the filler particles, (2) the chemical identity of the fillers, and (3) the distribution of the fillers throughout the mediums.

EDS mapping/imaging is used to identify and quantify elements in mediums and can be used to create elemental maps of mediums such that the chemical identity of the fillers can be determined. EDS mapping works in conjunction with electron imaging (e.g., using a scanning electron microscope) by scanning x-rays to measure the concentration of an element in an area of an object, and the determined elemental intensities can be analyzed to create an EDS map/image that illustrates the different elements present in the object. Thus, the EDS images can be produced for polymer components to distinguish between fillers and pores in the polymer component (see, e.g., FIG. 3). EDS images of polymer components are, therefore, useful in analyzing the quality of manufactured parts. However, these EDS images require a subject matter expert to review the image and make a subjective assessment of the part quality based on the EDS image. What is needed are systems, methods, and computer-readable media for quantitatively analyzing the quality of polymer components via EDS images. Further, what is needed is integration of the same into a production line for control of process parameters in manufacturing polymer components.

SUMMARY

Embodiments of the current disclosure solve the above-described problems and provide a distinct advancement in the art by providing systems, methods, and computer-readable media for automated, quantifiable characterization of polymer components from EDS images. The process may begin with obtaining an EDS image of a polymer component, which may be converted to grayscale for further processing. The grayscale image may be binarized using an intensity threshold applied to each pixel in the image to obtain a binary image. Segments of the binary image may be determined (e.g., using connected components analysis), and then contours may be generated around at least a subset of the segments in the binary image, such as the segments that represent fillers in the polymer component.

The resulting segmented, contoured image may be analyzed to determine geometric properties of the polymer component, which may include determining (1) the horizontal centroids of each filler region, (2) the vertical centroids of each filler region, and (3) the area of each filler region. Histograms may be generated for each of the horizontal centroids, the vertical centroids, and the areas, and the histograms may be displayed in a graphical user interface (GUI) to a user, along with the segmented, contoured image. The geometric data obtained about the polymer component may enable a user to quantitatively analyze the polymer component to determine, for example, the particle size distribution of fillers in the polymer component. This may be especially useful, for example, in quality control of manufactured polymer components. The analysis of the polymer components may be integrated in a production line such that the detection of a polymer component having, for example, an undesirable horizontal distribution of fillers may be flagged, and a corrective action may be taken in the production of the polymer components to minimize the number of erroneous polymer components that are produced. Furthermore, the segmented image may be used to quantify changes in pore morphology of a polymer component when subjected to a mechanical stress, such as a compressive stress.

In some embodiments, the techniques described herein relate to one or more non-transitory computer-readable media storing computer-executable instructions that, when executed by at least one processor, perform a method for automated characterization of fillers in polymer, including: obtaining, via an imaging system, an image of a polymer component, wherein the polymer component includes a plurality of fillers; binarizing the image using an intensity threshold applied to each pixel in the image to obtain a binary image; segmenting the binary image to obtain a segmented image including a plurality of filler segments; generating a plurality of contours around the plurality of filler segments to obtain a contoured, segmented image; determining, using the contoured, segmented image and for the plurality of contours, a plurality of horizontal centroid positions, a plurality of vertical centroid positions, and a plurality of areas; determining, based on the plurality of horizontal centroid positions, the plurality of vertical centroid positions, and the plurality of areas, whether the polymer component is acceptable or not acceptable based on manufacturing parameters of the polymer component; and responsive to determining the polymer component is not acceptable, causing a corrective action to be carried out.

In some embodiments, the techniques described herein relate to a system for automated characterization of fillers in polymer mediums via energy dispersive X-ray spectroscopy (EDS) imaging, including: an EDS imaging system configured to obtain an EDS image of a polymer component, the polymer component including a plurality of fillers; and one or more non-transitory media storing computer-executable instructions that, when executed by at least one processor, cause the system to carry out actions, including: segmenting the EDS image to obtain a segmented image including a plurality of filler segments; generating a plurality of contours corresponding to the plurality of filler segments; determining, for the plurality of contours, a plurality of horizontal centroid positions, a plurality of vertical centroid positions, and a plurality of areas; determining, based on the plurality of horizontal centroid positions, the plurality of vertical centroid positions, and the plurality of areas, whether the polymer component is acceptable or not acceptable based on manufacturing parameters of the polymer component; and responsive to determining the polymer component is not acceptable, causing a corrective action to be carried out.

In some embodiments, the techniques described herein relate to a method of automated characterization of fillers in polymer mediums, including: obtaining, via an imaging system, an image of a polymer component, wherein the imaging system is selected from a group consisting of an energy dispersive X-ray spectroscopy imaging system, a computed tomography imaging system, a radiograph imaging system, or a digital imaging system, and wherein the polymer component includes a plurality of fillers; segmenting the image to obtain a segmented image including a plurality of filler segments; generating a plurality of contours corresponding to the plurality of filler segments; determining, for the plurality of contours, a plurality of horizontal centroid positions, a plurality of vertical centroid positions, and a plurality of areas; generating a first histogram of the plurality of horizontal centroid positions, a second histogram of the plurality of vertical centroid positions, and a third histogram of the plurality of areas; causing display of, via a graphical user interface, the first histogram, the second histogram, and the third histogram; determining based on the first histogram, the second histogram, and the third histogram, whether the polymer component is within material parameters; and responsive to determining the polymer component is not within the material parameters, causing a corrective action to be carried out.

This summary is provided to introduce a selection of concepts in a simplified form that are further described below in the detailed description. This summary is not intended to identify key features or essential features of the claimed subject matter, nor is it intended to limit the scope of the claimed subject matter. Other aspects and advantages of the current present disclosure will be apparent from the following detailed description of the embodiments and the accompanying drawing figures.

BRIEF DESCRIPTION OF THE DRAWING FIGURES

Embodiments of the present disclosure are described in detail below with reference to the attached drawing figures, wherein.

Figure 1:
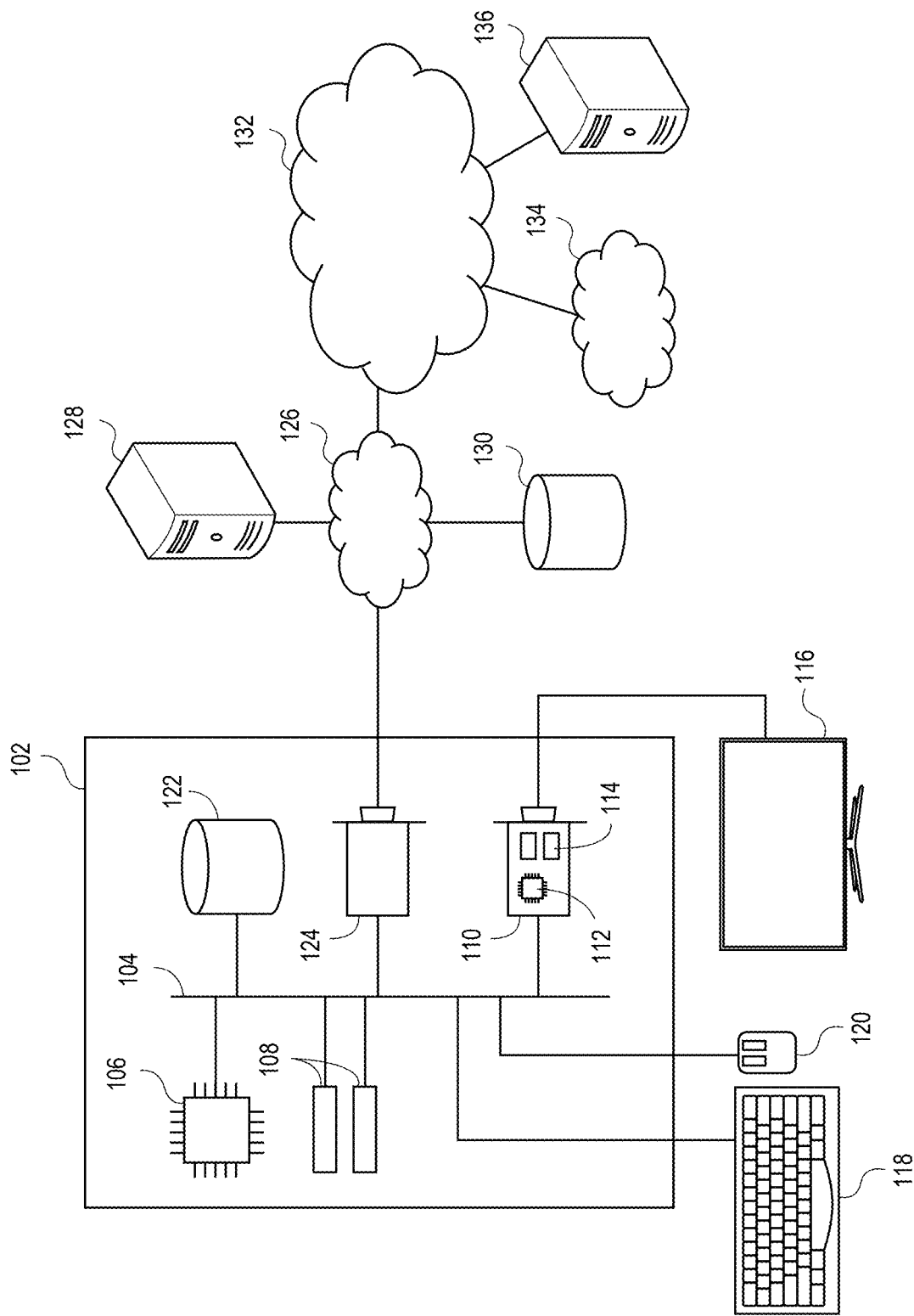
FIG. 1 illustrates an exemplary hardware platform for some embodiments.

The drawing figures do not limit the present disclosure to the specific embodiments disclosed and described herein. The drawings are not necessarily to scale; emphasis is instead placed upon clearly illustrating the principles of the present disclosure.

DETAILED DESCRIPTION

The following description of embodiments of the present disclosure references the accompanying illustrations that illustrate specific embodiments in which the present disclosure can be practiced. The embodiments are intended to describe aspects of the present disclosure in sufficient detail to enable those skilled in the art to practice the present disclosure. Other embodiments can be utilized, and changes can be made without departing from the scope of the present disclosure. The following detailed description is, therefore, not to be taken in a limiting sense.

In this description, references to "one embodiment," "an embodiment," "embodiments," "various embodiments," "certain embodiments," "some embodiments," or "other embodiments" mean that the feature or features being referred to are included in at least one embodiment of the technology. Separate references to "one embodiment," "an embodiment," "embodiments," "various embodiments," "certain embodiments," "some embodiments," or "other embodiments" in this description do not necessarily refer to the same embodiment and are also not mutually exclusive unless so stated and/or except as will be readily apparent to those skilled in the art from the description. For example, a feature, structure, act, etc., described in one embodiment may also be included in other embodiments but is not necessarily included. Thus, the current technology can include a variety of combinations and/or integrations of the embodiments described herein.

Generally, embodiments of the present disclosure are directed to systems, methods, and computer-readable media for analyzing energy-dispersive X-ray spectroscopy (EDS or EDX) images for quantitative analysis of polymer components. The analyses described herein may be useful for adjusting one or more process parameters in manufacturing polymer components, and the systems, methods, and computer-readable media disclosed herein may be integrated on a production line for automated adjustment of the process parameters during production of the polymer components.

An EDS imaging system may comprise a scanning electron microscope (SEM) and an EDS detector. When an EDS image is obtained using an EDS imaging system, the EDS image may be segmented to distinguish between the fillers and the pores in the polymer component, with contours drawn around the filler segments and displayed to a user via a GUI. The filler segments/regions may be analyzed to determine various geometrical properties thereof. For example, horizontal and/or vertical centroids may be determined, along with areas. Determining the horizontal and/or vertical centroids provides useful information about the center of masses of the fillers and the distribution thereof in the polymer component. The geometrical properties may be plotted on histograms, which may be displayed to a user via the GUI alongside the contoured EDS image. Furthermore, the EDS image may be utilized to determine changes in pore morphology in the polymer component when subjected to a mechanical stress, such as a compressive stress.

Embodiments are also contemplated in which a machine learning model is trained on EDS images to classify polymer components into one or more categories, such as an in-tolerance category or an out of tolerance category. For example, a machine learning model that classifies polymer components as within a manufacturing tolerance or outside the manufacturing tolerance is contemplated, where the machine learning model is trained on the resultant geometric information (e.g., centroids and areas) to classify the polymer component. Alternatively, or additionally, the machine learning model could classify the material as being within or outside material specifications. As another example, a machine learning model that analyzes SEM images to locate elemental regions of interest therein may be employed. In such an embodiment, the machine learning model may be trained on labeled EDS images superimposed over the SEM images and trained to identify elemental regions in the SEM image using the overlay.

Embodiments of the present disclosure provide a number of technical solutions to one or more technical problems in the art. First, embodiments described herein enable quantitative analysis of EDS images and pore morphology that was previously only done qualitatively. Second, embodiments described herein enable the adjustment of manufacturing process parameters of polymer components in the production line via an integrated EDS imager and analysis system for real-time analysis of lots of polymer components. Accordingly, the part quality of polymer components may be improved both by the quantitative data obtained by the systems and methods described herein and by the integration onto a production line. This, accordingly, represents an improvement over relying on a human to qualitatively analyze an EDS image and subjectively determine the part quality, which may lead to errors and a lack of repeatability due to the subjective analysis performed. Third, embodiments described herein are directed to the training and implementation of machine learning models for categorizing EDS images based on, for example, the pore morphology. Other technical advantages of the present disclosure will be readily apparent to those of skill in the art upon reading this disclosure.

Turning to FIG. 1, an exemplary hardware platform for certain embodiments is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple buses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments, no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media and may be internally installed in computer 102 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently and may be non-transitory computer-readable media storing data or computer-executable instructions. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as local network 126. NIC 124 can be any form of network interface known in the art, such as Ethernet, ATM, fiber, Bluetooth®, or Wi-Fi (i.e., the IEEE 102.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein, such as backup or versioning. Data stores can be local to a single computer such as computer 128, accessible on a local network such as local network 126, or remotely accessible over Internet 132. Local network 126 is, in turn, connected to Internet 132, which connects many networks such as local network 126, remote network 134, or directly attached computers such as computer 136. In some embodiments, computer 102 can itself be directly connected to Internet 132.

Figure 2:
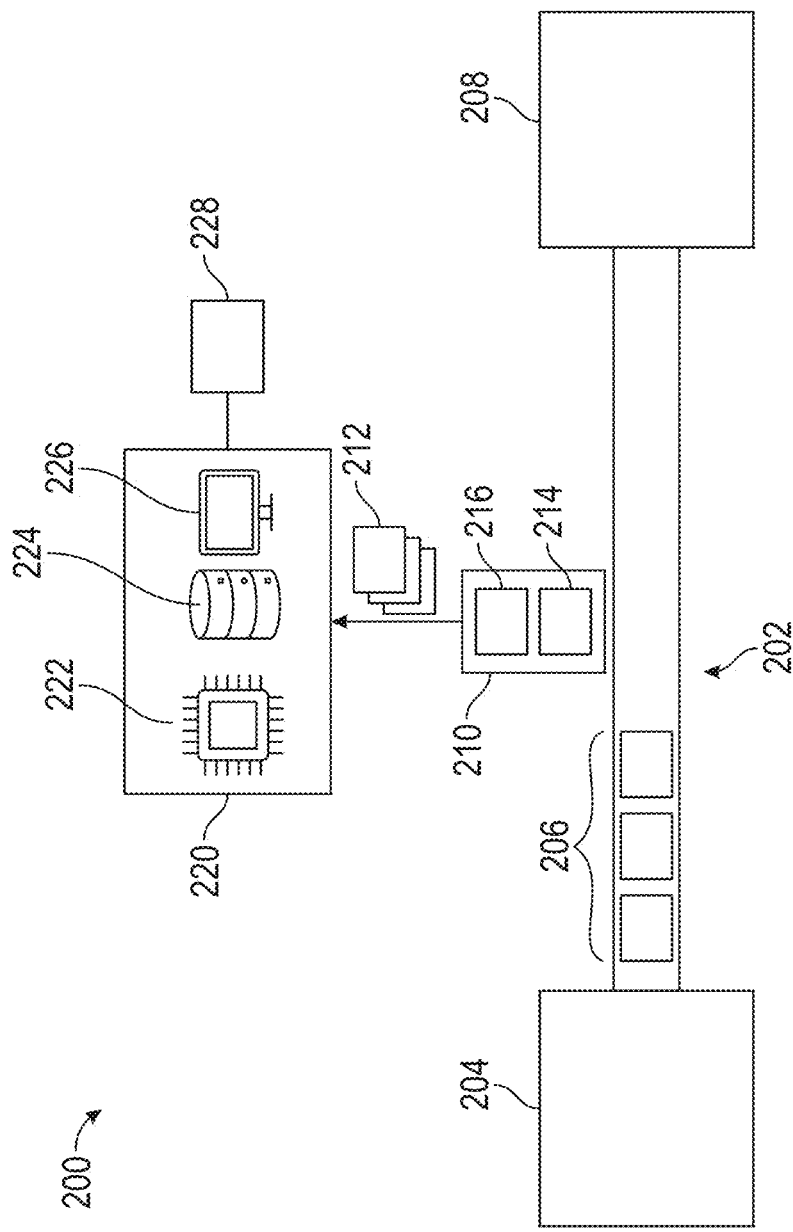
FIG. 2 illustrates a system for some embodiments.
Figure 3:
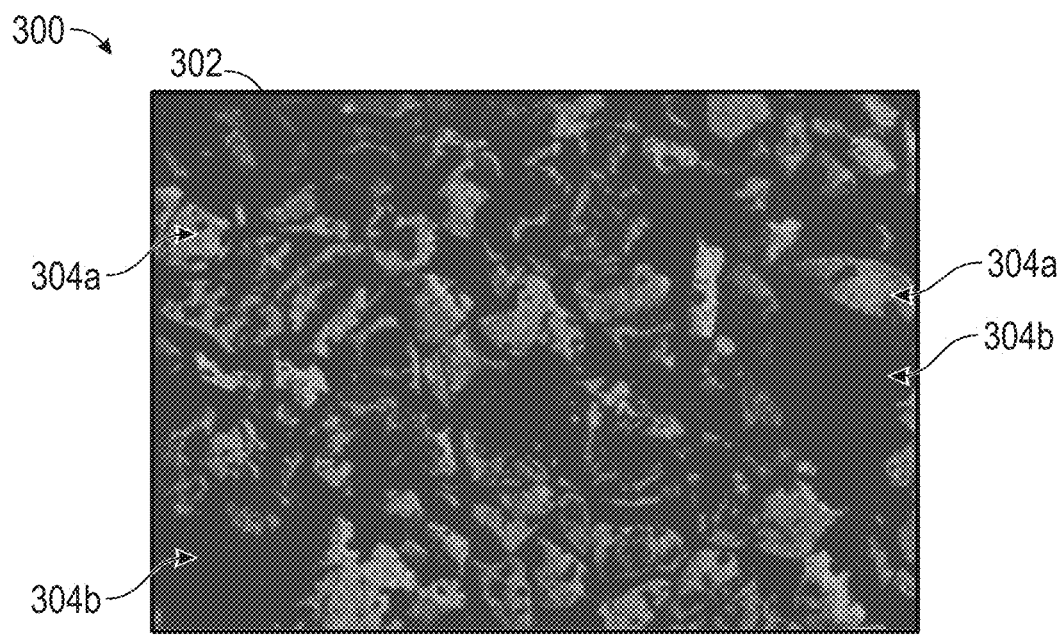
FIG. 3 illustrates an example EDS image for some embodiments.

FIG. 2 illustrates a system 200 for some embodiments of the present disclosure. System 200 may comprise various components for real-time analysis of polymer components on a production line 202 such that the manufacturing of the polymer components may be adjusted in real-time based on the analyses of EDS images as described in detail below. A manufacturing or production line, such as production line 202, may comprise a polymer manufacturing device 204 (e.g., an injection molding device, an additive manufacturing device, etc.) that manufactures polymer components 206, such as composite materials. The polymer components 206 may comprise fillers and pores as shown in FIG. 3.

Polymer components 206 may be transferred along production line 202 and to a collection area 208.

Production line 202 may additionally include an EDS system 210 configured to produce one or more instances of EDS image 212 (also referred to as EDS maps) of one or more of the polymer components 206. The EDS system 210 may include an electron microscope 214 (e.g., a scanning, transmission, or scanning transmission electron microscope), an EDS detector 216, and a computer 220 for processing the results. Any combination of electron microscope 214, an EDS detector 216, and computer 220 may be integrated into a common device or may be separate devices. For example, the electron microscope 214 may include EDS detector 216, while computer 220 may be a separate computing device that is communicatively coupled to the electron microscope 214. Embodiments are also contemplated in which other imaging systems, such as radiograph imaging systems, are used in addition to or in place of EDS system 210. For example, and as discussed with respect to FIGS. 7A-7E, it may be useful to employ radiographic imaging for a pore morphology analysis; however, the EDS system 210 described herein may also be used for the pore morphology analysis described below.

EDS system 210 may be integrated with production line 202, or EDS system 210 may be separate from production line 202. For example, EDS system 210 may be on a separate transport path to which a subset of polymer components, such as polymer components 206, are diverted from production line 202 for testing to ensure the quality of the batch produced by polymer manufacturing device 204. Generally, any arrangement of EDS system 210 within production line 202 to analyze one or more polymer components is within the scope hereof. Alternatively, EDS system 210 may be used separately from production line 202, i.e., not integrated with the manufacturing process of polymer components 206. Additionally, it will be appreciated that EDS system 210 may be used in the manufacturing process of polymer components 206 without being integrated into a production line 202, for example, when additively manufacturing polymer components 206.

Figure 6:
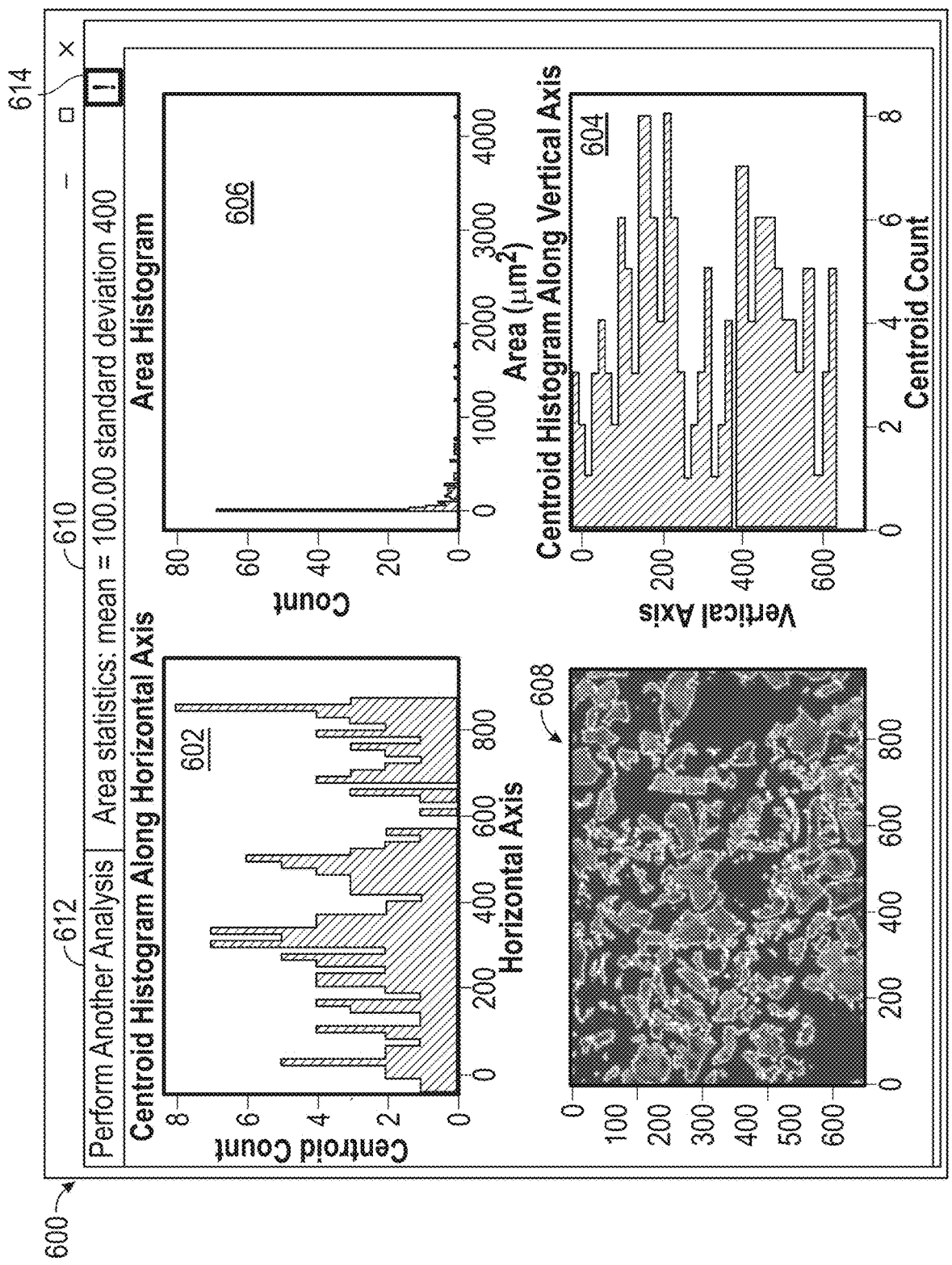
FIG. 6 illustrates an example graphical user interface for some embodiments.

As discussed above, EDS system 210 may include and/or be communicatively coupled to computer 220 (e.g., wired or wirelessly), and EDS system 210 may send the one or more instances of EDS image 212 to computer 220 for analysis. Computer 220 may be substantially similar to computer 102 and may include any combination of the components of computer 102 described with respect to FIG. 1. In some embodiments, computer 220 comprises at least one processor 222 and a memory 224, which may be configured as one or more non-transitory media that stores computer-executable instructions that, when executed by at least one processor 222, carry out any of the steps described herein. For example, the at least one processor 222, when executing the instructions stored in memory 224, may carry out any of the image analysis functionality described herein. In some embodiments, computer 220 includes one or more machine learning models that classify the EDS images 212, as discussed in further detail below with respect to FIG. 8. Computer 220 may further comprise or be coupled to a display 226. Display 226 may be configured to display the output of the image analysis performed by computer 220. In some embodiments, display 226 is configured to render a graphical user interface (GUI) depicting the results of the EDS analysis, as shown in FIG. 6 and discussed further below.

System 200 may additionally comprise a testing machine 228, such as a universal testing machine (UTM) configured to test the tensile strength, compressive strength, flexural strength, bending, shear, hardness, torsion strength, or any combination thereof of polymer components 206. In some embodiments, the testing machine 228 is a compression testing machine configured to test the compressive strength of polymer components 206. As discussed in further detail below with respect to FIGS. 7A-7E, in some embodiments, an EDS image 212 is captured before and after compression testing of polymer components 206, and the changes in the pore morphology are statistically analyzed.

FIG. 3 illustrates an example of an EDS image 300 of a polymer component 302 in accordance with aspects of the present disclosure. EDS image 300 may correspond to one of EDS images 212, and polymer component 302 may correspond to one of the polymer components 206 described above. As shown, EDS image 300 may include a plurality of filler regions like filler region 304a and a plurality of void or pore regions such as pore region 304b. EDS image 300 may be output by EDS system 210 as a color image in an RGB color scheme (or in any other color scheme), which may be converted to grayscale for further processing. In some embodiments, multiple instances of EDS image 300 may be received and processed. In some embodiments, the analyses described herein are performed on a polymer component 302 before and after the polymer component 302 is subjected to a stress to characterize any change in the structural properties of the polymer component due to the stress, as previously discussed.

The filler regions 304a may generally include fillers of any type. For example, fillers such as fiberglass, carbon fiber, carbon nanotubes, graphite fibers and/or nanoparticles, or any combination thereof may be employed. As another example, conductive fillers may be included to enhance the electrical conductivity of polymer component 302. Example conductive fillers include the aforementioned carbon fillers, carbon black, or other metal fibers and/or nanoparticles. Natural fillers, such as wood, bamboo, and the like, are also contemplated. The filler regions 304a may be rendered in a different color than the pore regions 304b due to the elemental mapping performed by EDS system 210.

Figure 4:
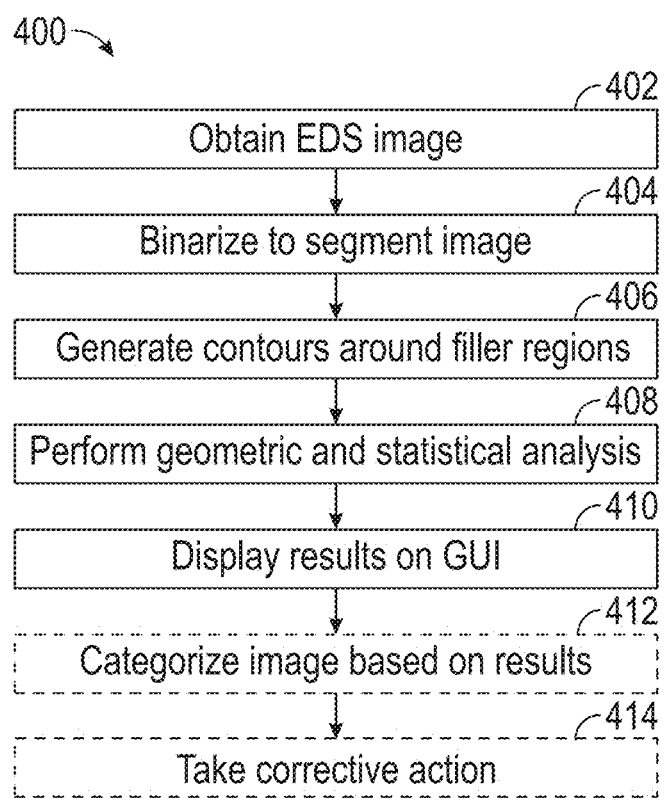
FIG. 4 illustrates a method for processing an EDS image for some embodiments.

Turning now to FIG. 4, a method 400 of processing an EDS image 300 is illustrated in accordance with embodiments of the present disclosure. Method 400 may begin at step 402 where an EDS image 300 is obtained, such as using EDS system 210. Obtaining an EDS image may involve scanning a polymer component 302 using an electron microscope 214, detecting x-rays using EDS detector 216, and processing the image by computer 220 to determine the elements in polymer components 206. Method 400 contemplates both real-time analysis of EDS image 300 (e.g., on a production line 202) and analysis of EDS image 300 at any point in time after capturing the EDS image 300. For example, when characterizing a polymer component 302 subjected to a stress event (e.g., a compression test), the analysis may not be real-time.

Next, at step 404, the image may be binarized to separate the filler regions 304a from the pore regions 304b. The EDS image 300 may be obtained as a color image, such as a red/green/blue (RGB) image, with the different colors distinguishing the different elements in polymer component 302. Accordingly, in some embodiments, binarizing the EDS image 300 first involves converting the color EDS image 300 to grayscale. The grayscale image may then be binarized using an intensity threshold in which pixels having an intensity value above the intensity threshold are set to 1 (i.e., white) and pixels having an intensity value below the intensity threshold are set to 0 (i.e., black). In some embodiments, the intensity value for pixels above the threshold is set to 255 when a 256-based scheme is employed. In some embodiments, the intensity threshold is 15 (on a scale of 0 to 255). Generally, any intensity value may be used for the thresholding, and the intensity value may be selected to be an intensity value that distinguishes the filler regions 304a from the pore regions 304b. The intensity value may be user-specified via computer 220. In some embodiments, the binarization is done using an adaptive thresholding method in which a different intensity threshold is applied to different regions of the EDS image 300. For example, the adaptive mean thresholding algorithm or the adaptive Gaussian thresholding algorithm may be employed.

Thereafter, at step 406, contours may be drawn/generated around one of the segmented regions. Drawing the contours may also involve performing connected component analysis on the binary image to identify continuously connected groups of pixels (i.e., segments) in the image, followed by drawing the contours around each of the continuously connected groups of pixels. Other methods of determining segments/regions in the binary image are within the scope hereof. In some embodiments, the contours are drawn around the filler regions 304a, which can be seen in FIG. 5. The geometric information of the contours may be used to characterize the polymer component 302, as discussed further below.

Figure 5:
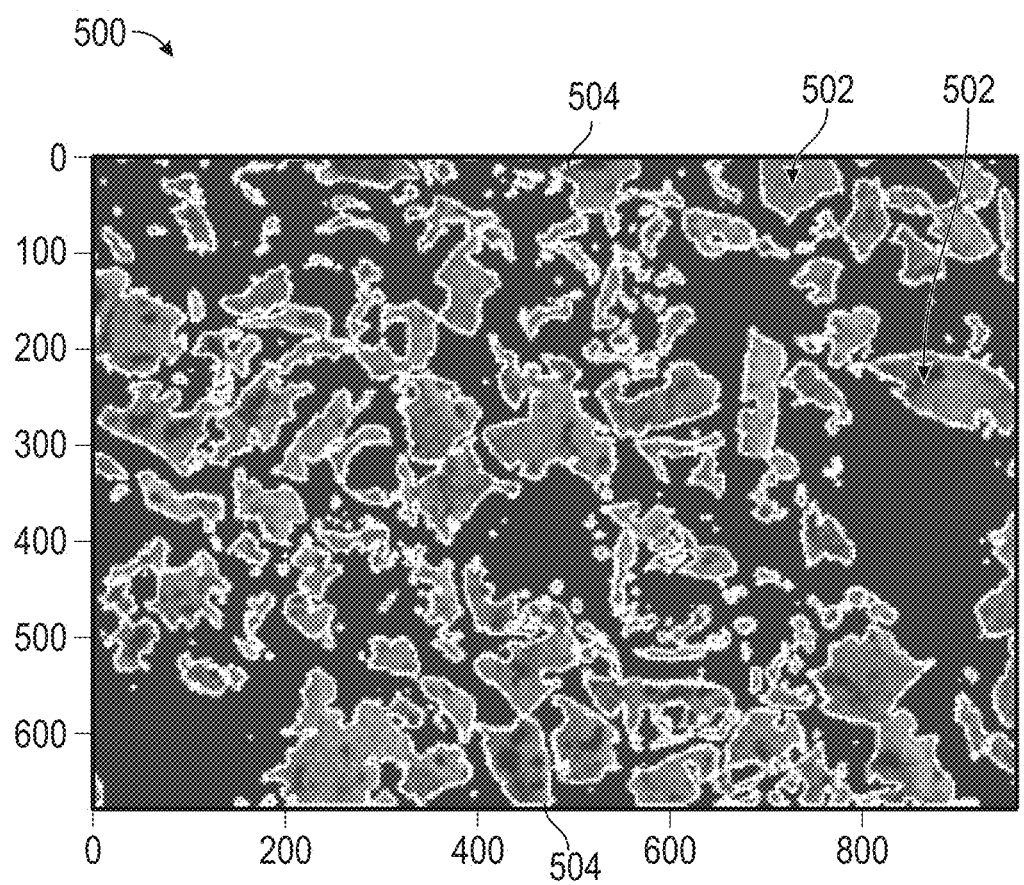
FIG. 5 illustrates an example contoured, segmented EDS image for some embodiments.

Before continuing with method 400, reference is now made to FIG. 5, which illustrates a contoured, segmented image 500 in accordance with aspects of the present disclosure. The origin point of the image is in the top left corner, as shown. Contoured, segmented image 500 may be the output of step 406 and includes segmented regions 502, corresponding to filler regions 304a from EDS image 300. Further, contours 504 (the white lines) have been drawn around each segmented region 502, which provides a visual aid to a viewer when segmented image 500 is presented via display 226. As part of generating the contours 504, the boundary points forming the contours may be stored, which may be used in performing the geometric analysis described below with respect to step 408. In some embodiments, the segmented regions 502 are converted back to their original color values, or the segmented regions 502 may be left as white, as in the binary image. It is contemplated that the inverse segmentation of EDS image 300 may be performed, e.g., the pore regions 304b may be segmented and contoured, while the non-porous regions (i.e., the fillers and the polymer media) are left as black. In such a case, the pixels in the pore regions 304b (i.e., having a pixel intensity below the intensity threshold) may have their pixel intensity set to 1, while the pixels in the filler regions 304a (i.e., having a pixel intensity above the intensity threshold) may have their pixel intensity set to 0.

Returning now to FIG. 4, after generating segmented image 500 at step 406, processing may proceed to step 408. At step 408, geometric analysis may be performed on the segmented regions 502 using the contours 504. In some embodiments, the geometric analysis involves determining the horizontal/x centroid of each segmented region 502. In some embodiments, the geometric analysis involves determining the vertical/y centroid of each segmented region 502. In some embodiments, the geometric analysis involves determining the area of each segmented region 502. The horizontal centroid may be determined based on the first moment of area about the x-axis, and the vertical centroid may be determined based on the first moment of area about the y-axis and provide useful information about the centers of mass of the fillers in the polymer component 302. In some embodiments, the geometric analysis involves determining each of the horizontal centroids, the vertical centroids, and the areas of the contour regions.

Determining the area of segmented regions 502 may involve using a scalar value that converts pixels to an area or other size measurement. In some embodiments, the scalar value is dependent on the image resolution, which may be based on the specific instance of EDS system 210 being used and/or the software implemented by computer 220 for producing one or more instances of EDS image 212. In an embodiment, the scalar relationship is 10 micrometers to about 50 pixels and 1 square micrometer to about 9 pixels. It will be appreciated that these values are exemplary, and any appropriate scalar value may be employed.

In some embodiments, step 408 additionally includes analyzing the sphericity and/or roundness of the filler segments. The sphericity and/or roundness may additionally be used as a measure for determining whether polymer component 302 is an acceptable or not-acceptable part (or within the manufacturing tolerances/material specifications or not within the manufacturing tolerances/material specifications) for polymer component 302. A histogram of the sphericity and/or roundness may likewise be computed and displayed via GUI 600. A polymer component 302 that has a number of fillers with a sphericity and/or roundness below a threshold sphericity and/or roundness may be marked as unacceptable. Other measures for determining the acceptability of a component based on the sphericity and/or roundness of a polymer component 302 (or based on any of the other parameters discussed herein) are within the scope hereof. For example, the distribution and location of fillers having a certain sphericity may be incorporated as a measure. Other metrics that may be analyzed to determine the acceptability of a polymer component (e.g., whether the component is within material specifications), include but are not limited to: the mean and standard deviation of the spheroidicity, the percent filler of the entire image 500, the percent pore of the entire image 500, statistical tests that compare the distributions in the horizontal and vertical histograms (see FIG. 6) to a constant distribution, hypothesis testing on means of exponential distributions for areas, nearest neighbor analysis to find neighboring fillers and/or pores, or any combination thereof.

In some embodiments, step 408 additionally includes performing statistical analysis on the geometric information of each contoured, segmented region 502 (or a subset of the contoured, segmented regions 502). In some embodiments, the statistics are related to the areas of the contoured regions and may include the mean of the areas along with the standard deviation of the area (see FIG. 6). Thereafter, at step 410, the results of the analysis and segmentation may be displayed via a GUI to a user, such as via display 226. It is contemplated that method 400 may be carried out using images obtained via radiographs given that the visual contrast if the polymer and the fillers have a visual contrast difference (e.g., a distinct radiopaque). In some such embodiments, the polymer component itself and/or the resulting radiograph images are modified to enhance the contrast between the polymer and the fillers, such as via adding contrast agents to the part and/or using software to enhance the contrast of the different image regions.

Reference is now made to FIG. 6, which depicts an exemplary graphical user interface, GUI 600, that may be the output of step 410. As shown, GUI 600 includes first histogram 602, second histogram 604, third histogram 606, and segmented image 608, which corresponds to segmented image 500 discussed previously. First histogram 602 may be a histogram of the horizontal centroids of the segmented regions 502 obtained at step 408. The first histogram 602 may include the centroid count on the vertical axis and the horizontal centroid location along the horizontal axis. Thus, first histogram 602 provides an indication of the distribution of the horizontal centers of masses of the fillers in polymer component 302. Similarly, second histogram 604 may be a histogram of the vertical centroids of the segmented regions 502, with the centroid count plotted on the horizontal axis, and the vertical centroid location along the vertical axis. Thus, second histogram 604 provides an indication of the distribution of the vertical centers of masses of the fillers in polymer component 302. Finally, the third histogram 606 may be the area histogram, with the area count on the vertical axis and the area value on the horizontal axis. Thus, third histogram 606 provides an indicator of the distribution of the areas of each filler, which may be utilized to determine any variation in size of the fillers, for example. Additionally, or alternatively, a histogram may be generated for any of the spheroidicity parameters discussed herein, and the spheroidicity metrics may be employed to determine whether a polymer component 302 is within desired material specifications. Statistics 610 relating to the area may be displayed in an upper region of the GUI 600, or at any other location in the GUI 600. In some embodiments, the statistics 610 include the mean area and the standard deviation of the mean area.

GUI 600 may further include an input 612 selectable by a user to carry out another analysis. When input 612 is selected, the user may be prompted to select another EDS image for analysis, which may be segmented and analyzed as discussed with respect to FIG. 4, and the results displayed via GUI 600.

Turning back to FIG. 4, processing may proceed with optional step 412, where the polymer component 302 may be classified based on the results of the analysis. In some embodiments, the classification is based on any of the first histogram 602, second histogram 604, and/or third histogram 606 and is made to determine whether the polymer component 302 is within material specifications for classification as an acceptable or not acceptable (defective) polymer component 302. For example, thresholds may be set for upper and/or lower bounds of the filler area, and if any or a threshold number of fillers fall outside the upper and/or lower bounds of the filler area, the polymer component 302 may be flagged as defective. Similarly, it is contemplated that thresholds may be employed for the centroids, such as a threshold number of fillers that are required to be in a certain region of the polymer component 302. For example, in a polymer component 302, it may be required for 15 fillers to have a horizontal centroid along the x-axis in the 0-200 µm range, 20 fillers to have a horizontal centroid along the x-axis in the 200-600 µm range, and 10 fillers to have the horizontal centroid in the 600+ µm range, and if the polymer component 302 does not meet the thresholds, the polymer component 302 may be flagged as defective. In some embodiments, the classification is done by a machine learning model as discussed further below with respect to FIG. 8. The classification may be an accept/reject classification, for example, where the reject classification is for any instances of polymer component 302 determined to be defective. A reject classification may result in changes to one or more processing parameters for the manufacturing of polymer component 302.

Next, at optional step 414, a corrective action may be taken. In some embodiments, the corrective action is based on the classification performed at optional step 412. The corrective action may be, for example, an adjustment to one or more processing parameters for the manufacturing of polymer component 302. For example, if polymer manufacturing device 204 is an injection molding device, the corrective action may involve increasing the shot length, injection pressure, melt temperature, injection speed, or an adjustment to any other parameter that may reduce the formation of voids in polymer component 302. As another example, if polymer manufacturing device 204 is an additive manufacturing device, the corrective action may involve adjusting the print speed of the nozzle, an adjustment to the nozzle toolpath, decreasing the layer thickness, increasing the nozzle temperature, or the like, or any combination thereof. As yet another example, if bulk materials were being manufactured in a continuous manner, other chemical reaction parameters for polymerization could be changed such as pressure, temperature, stir rate, amount of filler, amount of polymer, type of catalyst, or any combination thereof could also be changed to vary the properties of the bulk material output. In some embodiments, system 200 includes a PID controller or other feedback-based control loop in conjunction with the data obtained at step 408 to adjust the manufacturing parameters for polymer component 302. It is contemplated that any of the aforementioned parameters may be controlled using a PID control loop. In some embodiments, the corrective action is an alert 614 communicated to a user, such as via GUI 600.

Figure 7A:
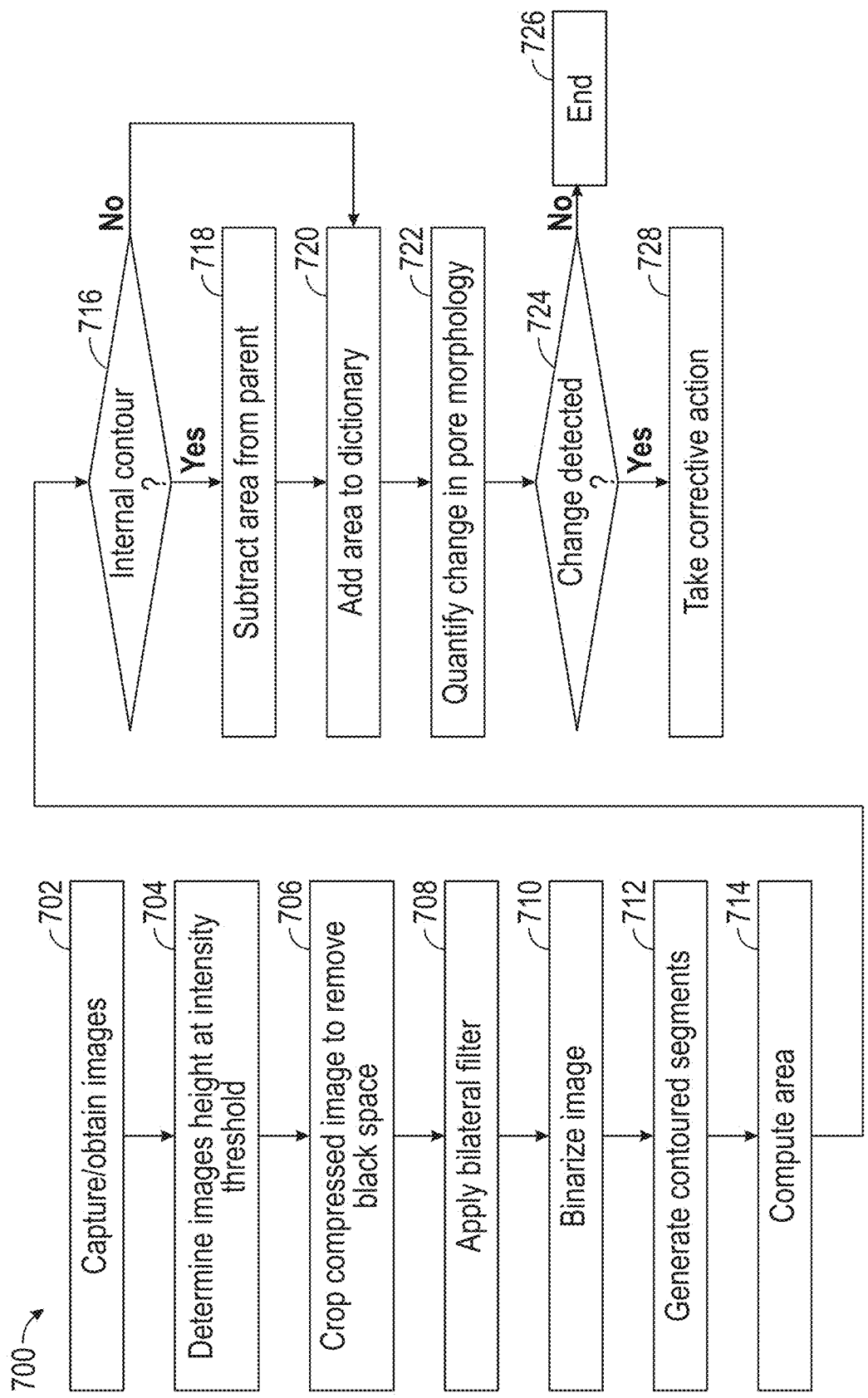
FIG. 7A illustrates a method for quantifying changes in pore morphology in response to a compressive force being applied to a component some embodiments.

Turning now to FIG. 7A, a method 700 of processing images (e.g., EDS images, SEM images, or radiograph images) to quantify changes in pore morphology when a polymer component is stressed is illustrated in accordance with embodiments of the present disclosure. Reference will also be made to FIGS. 7B-7E, which illustrate various stages of the image processing of method 700. In some embodiments, method 700 is used to analyze pore regions 304b of a polymer component 302. In some embodiments, method 700 is performed during or in conjunction with a compression test or other mechanical test performed on a polymer component 302 (e.g., using testing machine 228)

First, at step 702, at least two images of a polymer component 302 may be captured or otherwise obtained (e.g., using EDS system 210, using a radiograph imaging system, and/or retrieved from memory 224 in computer 220). The at least two images may be EDS images, SEM images, or radiograph images. EDS images may be used when the component 302 has enough filler material that the polymer media is indistinguishable from the pore. The at least two images may include a first image that is obtained before a mechanical stress (e.g., compression, tension, torsion, etc.) is applied to the polymer component 302 and a second image that is obtained after the mechanical stress is applied to the polymer component 302. The images may be captured in real-time while the mechanical stress is applied or at any point before, during, or after the mechanical stress is applied, or a combination thereof. In some embodiments, the at least two images are obtained as a video, and the two images are the first and last frames of the video obtained before/after the compression testing, or a first frame before applying the mechanical stress, and a second frame obtained after applying the mechanical stress.

Figure 7B:
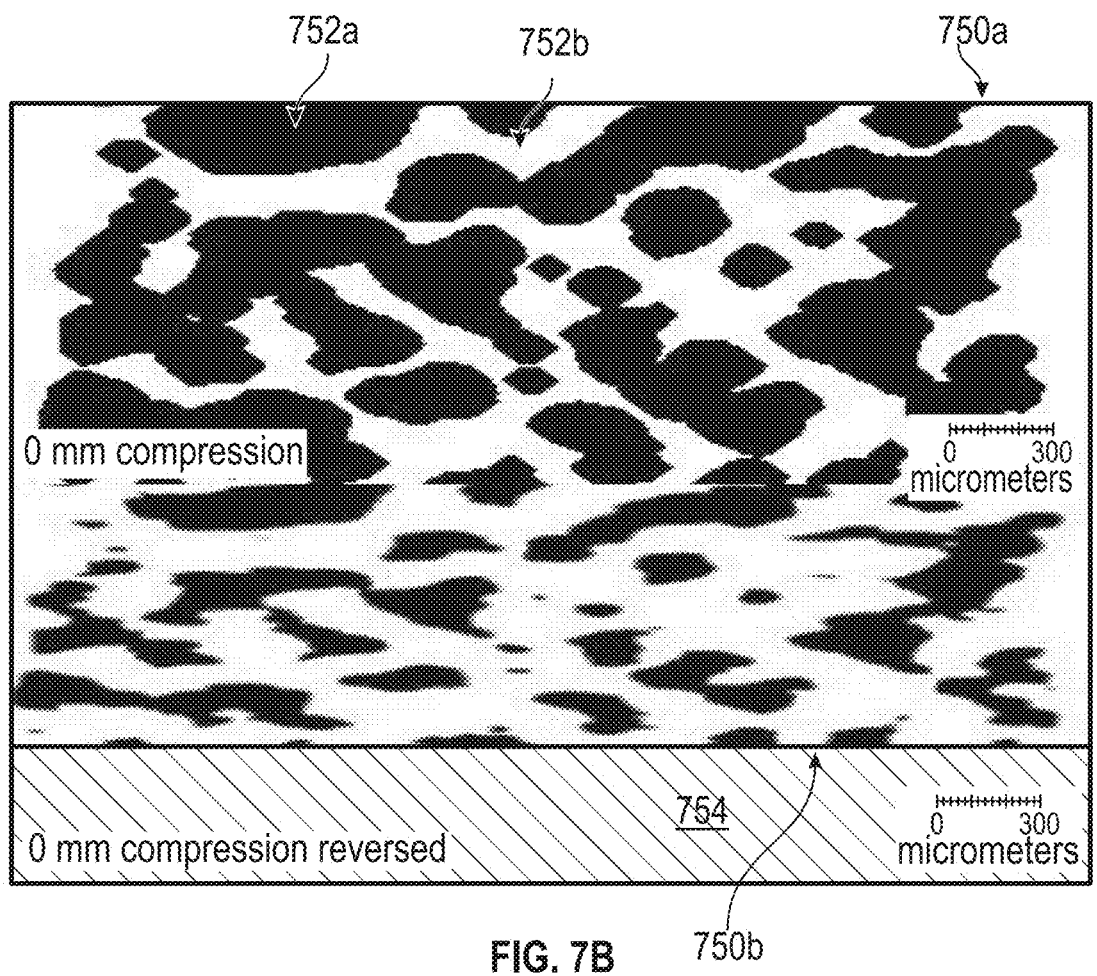
FIGS. 7B-7E illustrate images obtained through the method of FIG. 7A.
Figure 7C:
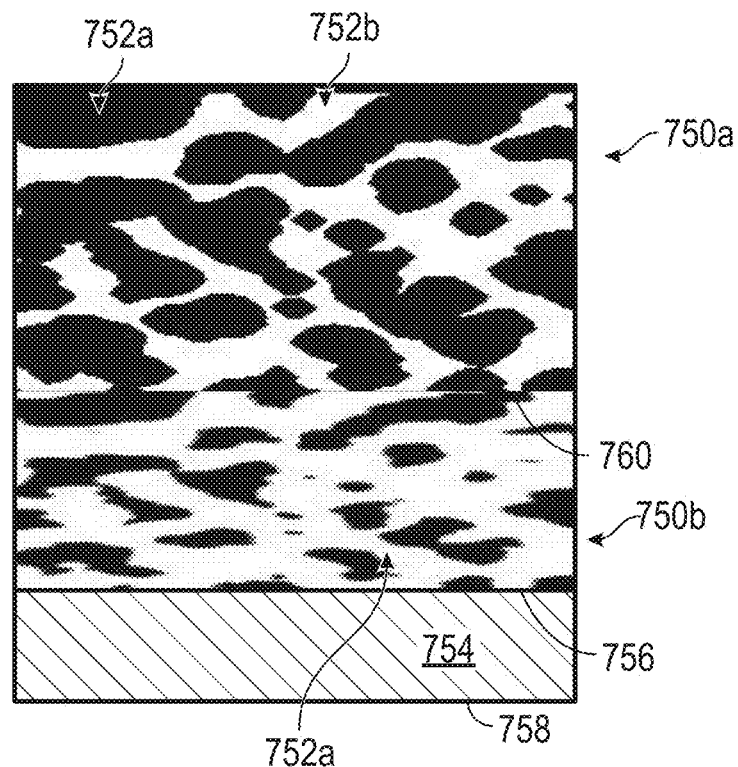

Reference is now made to FIGS. 7B and 7C, where an example of a pre-compression image 750a and an example of a post-compression image 750b are shown. FIGS. 7B-7E are shown in black and white for clarity of illustration but it will be appreciated that the images before the binarization step discussed below may be color or grayscale images. Like EDS image 300 described above, each of pre-compression image 750*a* and post-compression image 750*b* comprises filler regions 752*a* and pore regions 752*b*. For visual comparison, the pre-compression image 750*a* and post-compression image 750*b* may be stacked and displayed to the user via GUI 600. As shown in post-compression image 750*b*, the pore morphology of the polymer component has been changed due to the applied compression. As such, post-compression image 750*b* includes a region 754 that does not contain any polymer component, due to the decrease in height of the polymer component when compressed. Region 754 is illustrated with hashing for clarity of illustration, however, region 754 may instead show up as black or as a darker color when displayed via GUI 600. More specifically, region 754 may be the surface on which the polymer component is supported on when imaged or the instrument used to compress the material if the radiographs are taken in place where the compression occurs. It will be appreciated that when a mechanical stress other than compression is applied in testing the polymer component, region 754 may not be present. The change in height may be used to determine the amount of compression that the polymer component was subjected to.

As shown in FIG. 7B, textual data relating to the applied compression along with a scale may be present in pre-compression image 750*a* and post-compression image 750*b*. Accordingly, to reduce the likelihood that this extraneous data interferes with the below-described pore morphology analyses, the pre-compression image 750*a* and post-compression image 750*b* may be cropped, yielding the views of pre-compression image 750*a* and post-compression image 750*b* illustrated in FIG. 7C. Each of the two images may be cropped in the same manner (e.g., by the same amount) to ensure the two images remain as similar as possible for the subsequent comparison to determine the changes (if any) in the pore morphology. In some embodiments, pre-compression image 750*a* and post-compression image 750*b* may be obtained without the textual data and/or scale. In some embodiments, the textual data, scale, or any other extraneous data may be removed via cropping or any other method before further processing of pre-compression image 750*a* and post-compression image 750*b*.

Method 700 continues at step 704, where the height of the polymer component bottom 756 of post-compression image 750*b* from the frame bottom 758 of the image frame may be determined to enable the determination of the percent compression of the polymer component. To determine the height of the polymer component bottom 756 from the frame bottom 758, the post-compression image 750*b* may be searched from the frame bottom 758 upwards to locate a pixel with an intensity value above a threshold value. The intensity threshold may be used to detect a darker region of the post-compression image 750*b*, which will be present when the polymer component shrinks in height due to the compression.

In some embodiments, searching the post-compression image 750*b* for the pixel above the threshold value comprises transposing the grayscale version of post-compression image 750*b* to create a vertical scan line (not shown) at approximately the middle of post-compression image 750*b*. The vertical scan line may be an array of pixel intensities in order from the bottom of the image to the top of the image. The intensity threshold may be selected at an intensity expected to be seen in the polymer component, such that the region of post-compression image 750*b* that contains the component can be distinguished from another region in which it is not present due to being compressed. In one embodiment, the intensity is 60; however, any intensity value may be used as the threshold intensity value. The height of post-compression image 750*b*, as measured from the top 760 of the post-compression image 750*b* to the frame bottom 758 of post-compression image 750*b*, may also be stored. The heights of the pre-compression image 750*a* and post-compression image 750*b* may be the same. The post-compression image 750*b* may then be searched along the vertical scan line (e.g., from the bottom to the top) to locate a pixel having an intensity above the intensity threshold in order to detect black space in the image (i.e., to detect region 754), which may be the result of compressing the polymer component 302. The height of the pixel at the intensity threshold may be stored. This height therefore represents the bottom of the polymer component, which can be used when determining how much the polymer component was compressed, as discussed in further detail below.

Next, at step 706, the image may be cropped below the stored height that is representative of black space in the image, i.e., to remove region 754. Removing the black space may ensure that the black space does not interfere with the pore morphology analysis described below.

Figure 7D:
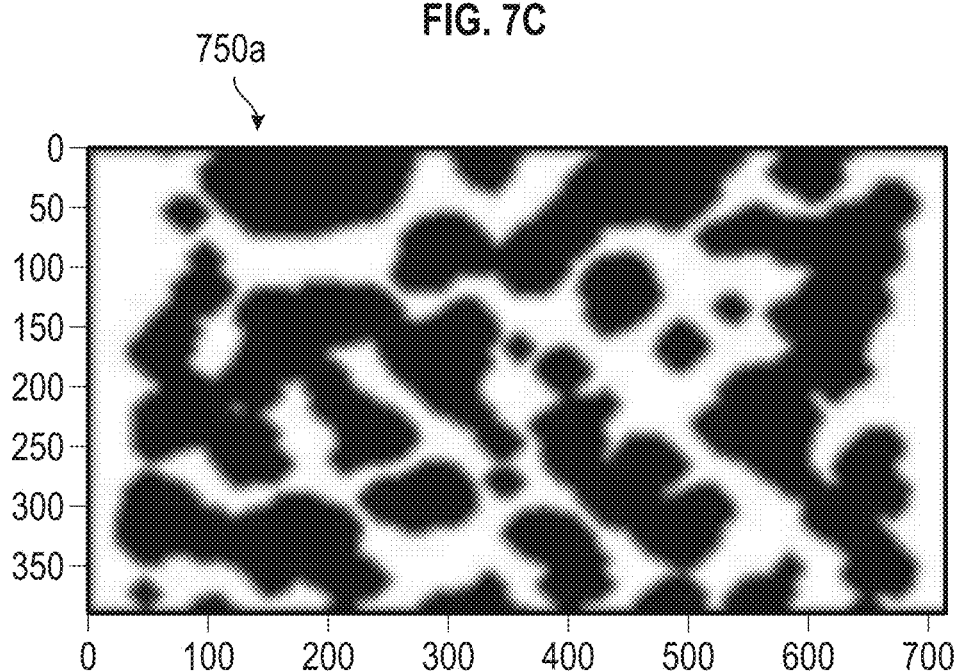

At step 708, a bilateral filter may be imposed on the image. Imposing a bilateral filter allows for the pore regions 752*b* to be smoothed out while maintaining the edge sharpness of pre-compression image 750*a* and post-compression image 750*b*. Thus, smoother, less noisy contours are obtainable during the thresholding of pre-compression image 750*a* and post-compression image 750*b* in the binarization process, discussed below. The bilateral filter replaces the intensity of each pixel using a weighted average of intensity values from neighboring pixels. The output of the bilateral filtering is shown in FIG. 7D for the pre-compression image 750*a*.

Figure 7E:
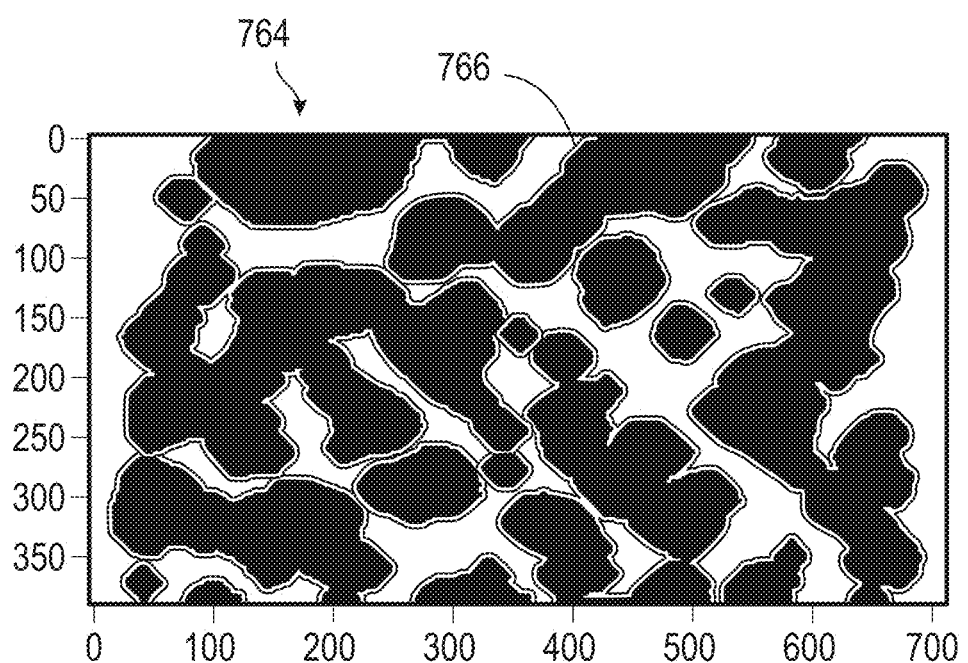

At step 710, pre-compression image 750*a* and post-compression image 750*b* may be binarized. Step 710 may be substantially similar to step 404 described above. In some embodiments, the pixel intensity threshold is set at 120; however, other values may be employed as will be appreciated by those of skill in the art. Once binarized, contours may be drawn at step 712, the output of which is shown in FIG. 7E. Step 712 may be substantially similar to step 406 described above. An exemplary contoured image 764 obtained from the pre-compression image 750*a* is shown in FIG. 7E, with the darker gray regions representing the pores and the lighter grey regions representing the fillers.

Processing may then proceed to steps 714-720, which may be repeated for all contours 766 in the contoured, segmented image. First, at step 714, the area of contour 766 may be determined. Then, at test 716, it may be determined whether (1) contour 766 is an internal contour or (2) contour 766 is an external contour or neither an external nor an internal contour. If it is determined that the contour is an internal contour (Yes at test 716), at step 718, the area of the internal contour may be subtracted from the area of the external contour within which the internal contour lies (accessible via the dictionary). Subtracting the contours in such a manner may prevent an incorrect calculation of the area by adjusting the area of external contours to remove the area of the interior contours. Processing may then proceed to step 720. Processing also may proceed from test 716 directly to step 720 if it is determined the contour is an external contour or is neither internal nor external (No at test 716). At step 720, the contour may be added to a dictionary (or other data representation) with the contour number as the key and the contour area as the value. Steps 714-720 may be repeated for all contours in the contoured image shown in FIG. 7E.

Thereafter, processing may proceed to step 722, where the change in the pore morphology may be quantified. Quantifying the change in the pore and material morphology of the polymer component after being subjected to mechanical stress may involve analyzing (1) the compression, (2) the pore count change, (3) the mean pore size may be analyzed, or any combination thereof.

The compression may be analyzed by determining the amount of compression may involve dividing the cutoff height as obtained at step 704 by the original image height and multiplying the result by 100% to obtain a percent compression.

The change in pore count may involve comparing the length of the dictionary/list of the pores in the original image to the length of the dictionary/list of the pores in the compressed image. Typically, the number of pores will increase due to stressing the polymer component 302.

To determine whether a statistically significant difference between the mean pore size in the two images exists, the means of the pre- and post-compression data sets may be analyzed using a confidence interval method. The following equation may be used for the confidence interval:

$$\lambda_m \in \left( \frac{2d_m \hat{\lambda}_m}{X^2_{2d_m, \alpha/2}}, \frac{2d_m \hat{\lambda}_m}{X^2_{2d_m, 1-\alpha/2}} \right)$$

In the above equation, $$\hat{\lambda}_m = \frac{x_m}{d_m};$$

$x_m = \sum_{i=1}^{d_m} t_{m,i}$; $\lambda_m$ is the mean of the exponentially distributed data; $d_m$ is the number of events in data set m; $t_{m,i}$ is the $i^{th}$ data point in data set m; $X^2_{2d_m, \alpha/2}$ is the value of the chi-squared distribution at $2d_m$ degrees of freedom and $\alpha/2$ probability, and $\alpha$ is the significance level to compute the confidence interval (e.g., for $\alpha=0.05$, the confidence interval, CI=0.95).

Processing may then proceed to test 724, where it may be determined whether a statistically significant change in the pore morphology was determined using the above equation. That is, using the confidence interval method, it can be determined whether the mean pore sizes are significantly different from one another after compressing the polymer component. Determining whether the mean pore sizes are significantly different may involve determining whether the uncompressed mean lies outside the confidence interval of the mean of the compressed image and vice versa. If no, processing may proceed to step 726, where the method terminates. If yes, processing may proceed to step 728 where a corrective action may be taken. Step 728 may be substantially similar to optional step 414 described above and may involve one or more automated adjustments to the manufacturing of the polymer component 302. Accordingly, the result of this analysis may be used to adjust the process parameters of forming a polymer component 302 in system 200.

Figure 8:
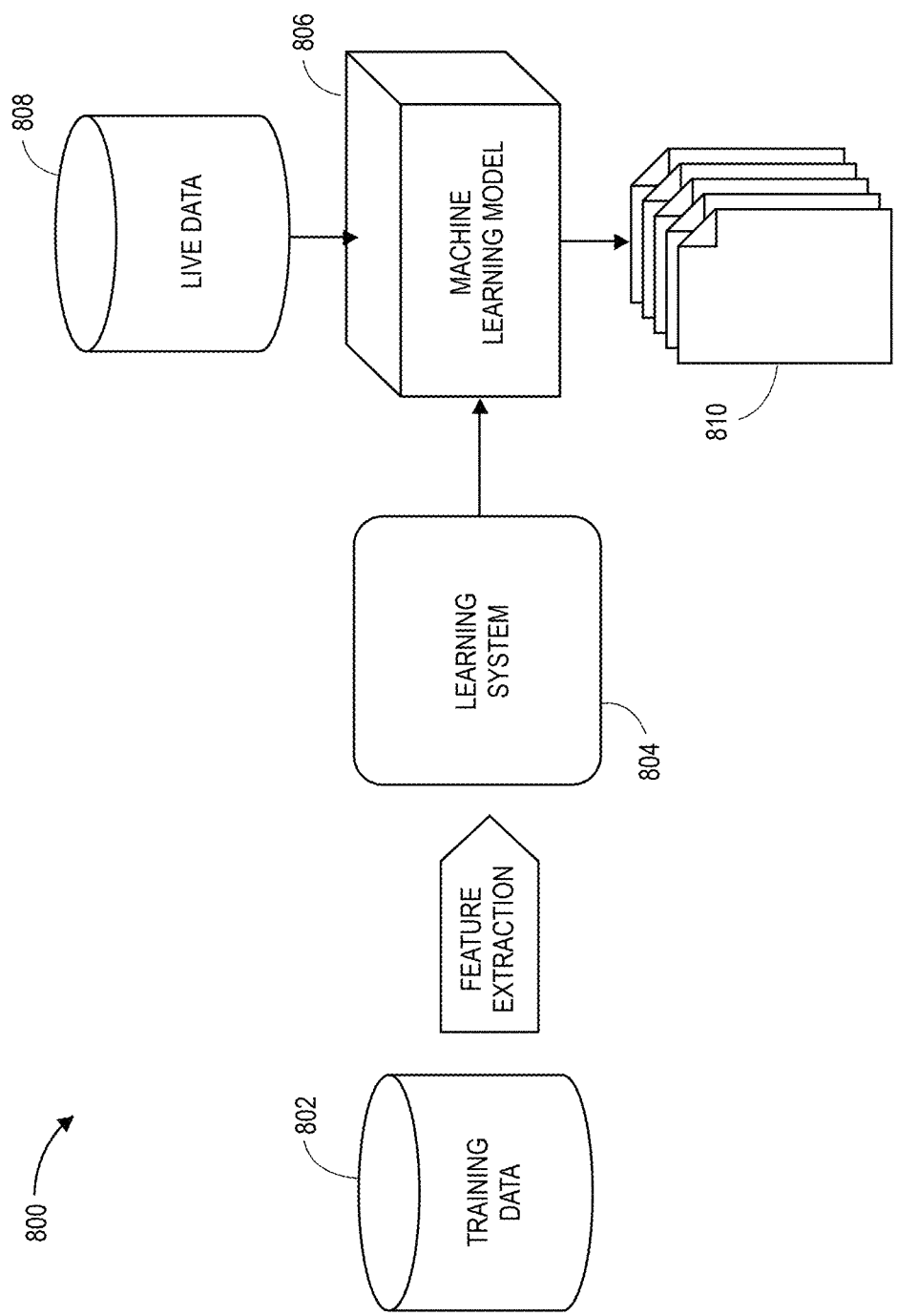
FIG. 8 illustrates a machine learning architecture for some embodiments.

Turning now to FIG. 8, a machine learning architecture 800 is illustrated in accordance with aspects of the present disclosure. Machine learning architecture 800 may be used with system 200, either integrated with computer 220 on production line 202 for in-line categorization of polymer components 206 or may be used separately from production line 202 as a quality check of the produced parts, for example. In some embodiments, machine learning architecture 800 is configured to classify polymer components 206 as acceptable or not acceptable as discussed in further detail below.

Machine learning architecture 800 may include training data 802, a learning system 804, and machine learning model 806. The learning system 804 may be, for example, a classification algorithm. The classification algorithm may be trained on training data 802 to yield the trained version of machine learning model 806. In some embodiments, the training data 802 includes pore morphology data, which may be labeled to indicate polymer components having acceptable pore morphology and those having unacceptable pore morphology. For example, the pore morphology data may relate to the mean pore size, the number of pores or the like, and the machine learning model 806 may be trained to predict, for example, failure of the polymer component 302 due to compression. Thus, once trained, machine learning model 806 may receive the pore morphology data (live data 808) of polymer components 206 as obtained from production line 202 and using method 700 described above and output a classification 810 of the polymer component 302 as passing or failing due to compression.

As another example of incorporating machine learning architecture 800 into system 200, it is contemplated that a machine learning model could be trained to segment EDS image 300 and identify filler regions 304a and pore regions 304b. Thus, in some such embodiments, the training data 802 includes a plurality of EDS images, such as EDS image 300, that are labeled with the filler regions 304a and pore regions 304b. The classification algorithm implemented by learning system 804 may then be trained on training data 802 this training data to classify regions in an image into filler regions 304a and pore regions 304b. Accordingly, each instance of EDS image 300 may be automatically segmented.

Accordingly, it is contemplated that system 200 may employ two machine learning models for processing EDS data. A first machine learning model may be configured to classify polymer components 206 as acceptable/not acceptable based on the pore morphology, and a second machine learning model may segment the images, which segmentation may be used in the pore morphology analysis as described with respect to FIG. 7A.

Features described above, as well as those claimed below may be combined in various ways without departing from the scope hereof. The following examples illustrate some possible, non-limiting combinations:

Clause 1. One or more non-transitory computer-readable media storing computer-executable instructions that, when executed by at least one processor, perform a method for automated characterization of fillers in polymer mediums, comprising: obtaining, via an imaging system, an image of a polymer component, wherein the polymer component includes a plurality of fillers; binarizing the image using an intensity threshold applied to each pixel in the image to obtain a binary image; segmenting the binary image to obtain a segmented image comprising a plurality of filler segments; generating a plurality of contours around the plurality of filler segments to obtain a contoured, segmented image; determining, using the contoured, segmented image and for the plurality of contours, a plurality of horizontal centroid positions, a plurality of vertical centroid positions, and a plurality of areas; determining, based on the plurality of horizontal centroid positions, the plurality of vertical centroid positions, and the plurality of areas, whether the polymer component is acceptable or not acceptable based on manufacturing parameters of the polymer component; and responsive to determining the polymer component is not acceptable, causing a corrective action to be carried out.

Clause 2. The media of clause 1, wherein the method further comprises: generating a first histogram of the plurality of horizontal centroid positions, a second histogram of the plurality of vertical centroid positions, and a third histogram of the plurality of areas; causing display of, via a graphical user interface, the first histogram, the second histogram, the third histogram, and the contoured, segmented image in a single window of the graphical user interface.

Clause 3. The media of clause 1 or 2, wherein the imaging system is selected from a group consisting of an energy dispersive X-ray spectroscopy imaging system, a computed tomography imaging system, a radiograph imaging system, or a digital imaging system.

Clause 4. The media of any of clauses 1-3, wherein the imaging system is the energy dispersive X-ray spectroscopy imaging system and comprises a scanning electron microscope and an EDS detector.

Clause 5. The media of any of clauses 1-4, wherein the plurality of fillers comprises at least one of carbon nanotubes, carbon fibers, carbon black, graphite nanoparticles or nanofibers, or electrically conductive nanoparticles.

Clause 6. The media of any of clauses 1-5, wherein the corrective action comprises at least one of: generating an alert displayed via a graphical user interface; or automatically adjusting at least one process parameter for the polymer component.

Clause 7. The media of any of clauses 1-6, wherein the image is a first energy dispersive X-ray spectroscopy (EDS) image, the polymer component further comprises further comprises a plurality of pores, and wherein the method further comprises: performing one of a compression test or a tensile test on the polymer component; obtaining a second EDS image of the polymer component; and comparing the second EDS image to the first EDS image to determine changes in a pore morphology of the polymer component.

Clause 8. A system for automated characterization of fillers in polymer mediums via energy dispersive X-ray spectroscopy (EDS) imaging, comprising: an EDS imaging system configured to obtain an EDS image of a polymer component, the polymer component including a plurality of fillers; and one or more non-transitory media storing computer-executable instructions that, when executed by at least one processor, cause the system to carry out actions, comprising: segmenting the EDS image to obtain a segmented image comprising a plurality of filler segments; generating a plurality of contours corresponding to the plurality of filler segments; determining, for the plurality of contours, a plurality of horizontal centroid positions, a plurality of vertical centroid positions, and a plurality of areas; determining, based on the plurality of horizontal centroid positions, the plurality of vertical centroid positions, and the plurality of areas, whether the polymer component is acceptable or not acceptable based on manufacturing parameters of the polymer component; and responsive to determining the polymer component is not acceptable, causing a corrective action to be carried out.

Clause 9. The system of clause 8, wherein the EDS imaging system is integrated onto a production line or a manufacturing line to image the polymer component while on the production line or the manufacturing line, wherein the EDS imaging system comprises a scanning electron microscope and an EDS detector.

Clause 10. The system of clause 8 or 9, wherein determining whether the polymer component is within the manufacturing parameters is performed by a machine learning model.

Clause 11. The system of any of clauses 8-10, wherein the actions further comprise prior to segmenting the EDS image: applying a bilateral filter to the EDS image to obtain a filtered image; and binarizing the filtered image to obtain a binary image, wherein segmenting the EDS image is performed on the binary image.

Clause 12. The system any of clauses 8-11, wherein the polymer component further comprises a plurality of pores, wherein the EDS image is a first, pre-compression EDS image, and wherein the actions further comprise: obtaining a second, post-compression EDS image; and determining changes in pore morphology based on the first, pre-compression EDS image and the second, post-compression EDS image.

Clause 13. The system of any of clauses 8-12, wherein determining the changes in the pore morphology comprises determining an amount of compression of the polymer component by: determining a new height of the polymer component in the second, post-compression EDS image using a second intensity threshold that distinguishes the polymer component from a background of the second, post-compression EDS image; and determining the amount of compression based on an original height of the polymer component and the new height of the polymer component.

Clause 14. The system of any of clauses 8-13, wherein determining the changes in the pore morphology comprises determining a change in a first number of pores in the first, pre-compression EDS image relative to a second number of pores in the second, post-compression EDS image.

Clause 15. The system of any of clauses 8-14, wherein determining the changes in the pore morphology comprises determining whether a statistically significant change in a mean of a pore size between the first, pre-compression EDS image and the second, post-compression EDS image exists.

Clause 16. A method of automated characterization of fillers in polymer mediums, comprising: obtaining, via an imaging system, an image of a polymer component, wherein the imaging system is selected from a group consisting of an energy dispersive X-ray spectroscopy imaging system, a computed tomography imaging system, a radiograph imaging system, or a digital imaging system, and wherein the polymer component includes a plurality of fillers; segmenting the image to obtain a segmented image comprising a plurality of filler segments; generating a plurality of contours corresponding to the plurality of filler segments; determining, for the plurality of contours, a plurality of horizontal centroid positions, a plurality of vertical centroid positions, and a plurality of areas; generating a first histogram of the plurality of horizontal centroid positions, a second histogram of the plurality of vertical centroid positions, and a third histogram of the plurality of areas; causing display of, via a graphical user interface, the first histogram, the second histogram, and the third histogram; determining based on the first histogram, the second histogram, and the third histogram, whether the polymer component is within material parameters; and responsive to determining the polymer component is not within the material parameters, causing a corrective action to be carried out.

Clause 17. The method of clause 16, further comprising determining a sphericity of the plurality of filler segments.

Clause 18. The method of clause 16 or 17, further comprising: determining an acceptability of the polymer component based on at least one of the plurality of horizontal centroid positions, the plurality of vertical centroid positions, the plurality of areas, or the sphericity.

Clause 19. The method of any of clauses 16-18, wherein segmenting the image comprises using an adaptive thresholding algorithm.

Clause 20. The method of any of clauses 16-19, wherein the method further comprises: training a machine learning model to segment the image into the plurality of filler segments using training data comprises a plurality of labelled images.

Although the present disclosure has been described with reference to the embodiments illustrated in the attached drawing figures, it is noted that equivalents may be employed, and substitutions made herein without departing from the scope of the present disclosure as recited in the claims.

Having thus described various embodiments of the present disclosure, what is claimed as new and desired to be protected by Letters Patent includes the following:

1. One or more non-transitory computer-readable media storing computer-executable instructions that, when executed by at least one processor, perform a method for automated characterization of fillers in polymer mediums, comprising:
   obtaining, via an imaging system, an image of a polymer component,
   wherein the polymer component includes a plurality of fillers;
   binarizing the image using an intensity threshold applied to each pixel in the image to obtain a binary image;
   segmenting the binary image to obtain a segmented image comprising a plurality of filler segments;
   generating a plurality of contours around the plurality of filler segments to obtain a contoured, segmented image;
   determining, using the contoured, segmented image and for the plurality of contours, a plurality of horizontal centroid positions, a plurality of vertical centroid positions, and a plurality of areas;
   determining, based on the plurality of horizontal centroid positions, the plurality of vertical centroid positions, and the plurality of areas, whether the polymer component is acceptable or not acceptable based on manufacturing parameters of the polymer component; and
   responsive to determining the polymer component is not acceptable, causing a corrective action to be carried out.

2. The media of claim 1, wherein the method further comprises:
   generating a first histogram of the plurality of horizontal centroid positions, a second histogram of the plurality of vertical centroid positions, and a third histogram of the plurality of areas; and
   causing display of, via a graphical user interface, the first histogram, the second histogram, the third histogram, and the contoured, segmented image in a single window of the graphical user interface.

3. The media of claim 1, wherein the imaging system is selected from a group consisting of an energy dispersive X-ray spectroscopy imaging system, a computed tomography imaging system, a radiograph imaging system, or a digital imaging system.

4. The media of claim 3, wherein the imaging system is the energy dispersive X-ray spectroscopy imaging system and comprises a scanning electron microscope and an EDS detector.

5. The media of claim 1, wherein the plurality of fillers comprises at least one of carbon nanotubes, carbon fibers, carbon black, graphite nanoparticles or nanofibers, or electrically conductive nanoparticles.

6. The media of claim 1, wherein the corrective action comprises at least one of:
   generating an alert displayed via a graphical user interface; or
   automatically adjusting at least one process parameter for the polymer component.

7. The media of claim 1, wherein the image is a first energy dispersive X-ray spectroscopy (EDS) image, the polymer component further comprises further comprises a plurality of pores, and wherein the method further comprises:
   performing one of a compression test or a tensile test on the polymer component;
   obtaining a second EDS image of the polymer component; and
   comparing the second EDS image to the first EDS image to determine changes in a pore morphology of the polymer component.

8. A system for automated characterization of fillers in polymer mediums via energy dispersive X-ray spectroscopy (EDS) imaging, comprising:
   an EDS imaging system configured to obtain an EDS image of a polymer component, the polymer component including a plurality of fillers; and
   one or more non-transitory media storing computer-executable instructions that, when executed by at least one processor, cause the system to carry out actions, comprising:
     segmenting the EDS image to obtain a segmented image comprising a plurality of filler segments;
     generating a plurality of contours corresponding to the plurality of filler segments;
     determining, for the plurality of contours, a plurality of horizontal centroid positions, a plurality of vertical centroid positions, and a plurality of areas;
     determining, based on the plurality of horizontal centroid positions, the plurality of vertical centroid positions, and the plurality of areas, whether the polymer component is acceptable or not acceptable based on manufacturing parameters of the polymer component; and
     responsive to determining the polymer component is not acceptable, causing a corrective action to be carried out.

9. The system of claim 8,
   wherein the EDS imaging system is integrated onto a production line or a manufacturing line to image the polymer component while on the production line or the manufacturing line,
   wherein the EDS imaging system comprises a scanning electron microscope and an EDS detector.

10. The system of claim 8, wherein determining whether the polymer component is within the manufacturing parameters is performed by a machine learning model.

11. The system of claim 10, wherein the actions further comprise prior to segmenting the EDS image:
   applying a bilateral filter to the EDS image to obtain a filtered image; and
   binarizing the filtered image to obtain a binary image,
   wherein segmenting the EDS image is performed on the binary image.

12. The system of claim 8, wherein the polymer component further comprises a plurality of pores, wherein the EDS image is a first, pre-compression EDS image, and wherein the actions further comprise:

obtaining a second, post-compression EDS image; and determining changes in pore morphology based on the first, pre-compression EDS image and the second, post-compression EDS image.

13. The system of claim 12, wherein determining the changes in the pore morphology comprises determining an amount of compression of the polymer component by:

determining a new height of the polymer component in the second, post-compression EDS image using a second intensity threshold that distinguishes the polymer component from a background of the second, post-compression EDS image; and determining the amount of compression based on an original height of the polymer component and the new height of the polymer component.

14. The system of claim 12, wherein determining the changes in the pore morphology comprises determining a change in a first number of pores in the first, pre-compression EDS image relative to a second number of pores in the second, post-compression EDS image.

15. The system of claim 12, wherein determining the changes in the pore morphology comprises determining whether a statistically significant change in a mean of a pore size between the first, pre-compression EDS image and the second, post-compression EDS image exists.

16. A method of automated characterization of fillers in polymer mediums, comprising:

obtaining, via an imaging system, an image of a polymer component, wherein the imaging system is selected from a group consisting of an energy dispersive X-ray spectroscopy imaging system, a computed tomography imaging system, a radiograph imaging system, or a digital imaging system, and wherein the polymer component includes a plurality of fillers;

segmenting the image to obtain a segmented image comprising a plurality of filler segments;

generating a plurality of contours corresponding to the plurality of filler segments;

determining, for the plurality of contours, a plurality of horizontal centroid positions, a plurality of vertical centroid positions, and a plurality of areas;

generating a first histogram of the plurality of horizontal centroid positions, a second histogram of the plurality of vertical centroid positions, and a third histogram of the plurality of areas;

causing display of, via a graphical user interface, the first histogram, the second histogram, and the third histogram;

determining based on the first histogram, the second histogram, and the third histogram, whether the polymer component is within material parameters; and responsive to determining the polymer component is not within the material parameters, causing a corrective action to be carried out.

17. The method of claim 16, further comprising determining a sphericity of the plurality of filler segments.

18. The method of claim 17, further comprising:

determining an acceptability of the polymer component based on at least one of the plurality of horizontal centroid positions, the plurality of vertical centroid positions, the plurality of areas, or the sphericity.

19. The method of claim 16, wherein segmenting the image comprises using an adaptive thresholding algorithm.

20. The method of claim 16, wherein the method further comprises:

training a machine learning model to segment the image into the plurality of filler segments using training data comprises a plurality of labelled images.

* * * * *